US012618478B2

(12) United States Patent
Swenson et al.

(10) Patent No.: US 12,618,478 B2
(45) Date of Patent: May 5, 2026

(54) FLOW CONTROL VALVE WITH EROSION PROTECTION

(71) Applicant: Schlumberger Technology Corporation, Sugar Land, TX (US)

(72) Inventors: Brad Swenson, Friendswood, TX (US); David Clayton, Angleton, TX (US); David Gomez Ramirez, Rosharon, TX (US); Oguzhan Guven, Bellaire, TX (US); Cash Elston, Taubate (BR); Ivan Caliu Candiani, Taubate (BR); Bernardo Machado, Taubate (BR)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 18/809,104

(22) Filed: Aug. 19, 2024

(65) Prior Publication Data

US 2024/0410472 A1     Dec. 12, 2024

Related U.S. Application Data

(63) Continuation of application No. 17/758,998, filed as application No. PCT/US2021/014159 on Jan. 20, 2021, now Pat. No. 12,066,122.

(60) Provisional application No. 62/963,361, filed on Jan. 20, 2020.

(51) Int. Cl.
| | |
|---|---|
| *F16K 3/24* | (2006.01) |
| *E21B 34/08* | (2006.01) |
| *F16K 3/26* | (2006.01) |
| *F16K 25/04* | (2006.01) |

(52) U.S. Cl.
CPC ............... *F16K 3/243* (2013.01); *E21B 34/08* (2013.01); *F16K 3/26* (2013.01); *F16K 25/04* (2013.01)

(58) Field of Classification Search
CPC . F16K 3/243; F16K 3/26; F16K 25/04; E21B 34/08
See application file for complete search history.

(56) References Cited

U.S. PATENT DOCUMENTS

| | | | |
|---|---|---|---|
| 4,080,982 | A | 3/1978 | Maezawa |
| 4,212,473 | A | 7/1980 | Arai |
| 5,979,558 | A | 11/1999 | Bouldin et al. |
| 6,450,255 | B2 | 9/2002 | Carmody et al. |

(Continued)

FOREIGN PATENT DOCUMENTS

| | | |
|---|---|---|
| CN | 203717914 U | 7/2014 |
| JP | 2008240993 A | 10/2008 |

(Continued)

OTHER PUBLICATIONS

International Search Report and Written Opinion of PCT Application No. PCT/US2021/014159 dated May 7, 2021, 12 pages.

*Primary Examiner* — Craig M Schneider
*Assistant Examiner* — Christopher D Ballman
(74) *Attorney, Agent, or Firm* — Kyle R. Miiller

(57) ABSTRACT

The disclosure herein generally relates to flow Flow control valves for preventing, inhibiting, reducing the likelihood or extent of, and/or protect against erosion or components are provided. The flow control valves provided include various mechanisms to prevent, inhibit, reduce the likelihood or extent of, and/or protect against erosion of components of the flow control valve, for example, due to the effects of leakage flow.

12 Claims, 11 Drawing Sheets

(56)                      References Cited

U.S. PATENT DOCUMENTS

| | | | |
|---|---|---|---|
| 6,484,800 | B2 | 11/2002 | Carmody et al. |
| 6,612,547 | B2 | 9/2003 | Carmody et al. |
| 6,722,439 | B2 | 4/2004 | Garay et al. |
| 6,860,330 | B2 | 3/2005 | Jackson |
| 8,827,238 | B2 | 9/2014 | Geddes et al. |
| 9,222,340 | B2 | 12/2015 | Holderman et al. |
| 10,358,899 | B2 | 7/2019 | El Mallawany et al. |
| 2004/0035591 | A1 | 2/2004 | Echols |
| 2005/0284642 | A1 | 12/2005 | Wong |
| 2012/0325500 | A1* | 12/2012 | Moen ..................... E21B 43/12 166/205 |
| 2014/0262301 | A1* | 9/2014 | Holderman ............ E21B 43/12 166/316 |
| 2014/0262324 | A1* | 9/2014 | Greci ..................... E21B 34/10 166/194 |

FOREIGN PATENT DOCUMENTS

| | | | |
|---|---|---|---|
| WO | 0186113 | A1 | 11/2001 |
| WO | 2017160291 | A1 | 9/2017 |
| WO | 2019246501 | A1 | 12/2019 |

* cited by examiner

FLOW CONTROL VALVE WITH EROSION PROTECTION

CROSS-REFERENCE TO RELATED APPLICATIONS

Any and all applications for which a foreign or domestic priority claim is identified in the Application Data Sheet as filed with the present application are hereby incorporated by reference under 37 CFR 1.57. The present application is a continuation of U.S. Non-Provisional application Ser. No. 17/758,998 filed Jul. 18, 2022, issued as U.S. Pat. No. 12,066,122, which is a National Stage of International Application No. PCT/US2021/014159, filed Jan. 20, 2021, which claims priority benefit of U.S. Provisional Application No. 62/963,361, filed Jan. 20, 2020, the entirety of each of which is incorporated by reference herein and should be considered part of this specification.

BACKGROUND

Field

The present disclosure generally relates to flow control valves, and more particularly to systems and methods for preventing or reducing erosion of flow control valves.

Description of the Related Art

Oil and gas wells can include one or more downhole flow control valves (FCVs). FCVs can control the flow of fluid (e.g., hydrocarbons) from the exterior of the FCV to the interior of the FCV and into the production tubing string and/or the flow of fluid (e.g., injection fluid) from the interior of the FCV to the exterior of the FCV. FCVs typically include a choke that is adjustable to adjust fluid flow through the valve.

SUMMARY

The present disclosure describes new concepts for the choking mechanism of a flow control valve to advantageously help prevent, inhibit, reduce the likelihood or extent of, and/or protect against erosion of components of the flow control valve, for example, due to the effects of leakage flow. In some configurations, the present disclosure provides a mechanism to prevent or inhibit fluid flow through the leakage gap.

In some configurations, a flow control valve includes a housing having at least one orifice; a choke sleeve disposed within the housing, the choke sleeve having a plurality of choking orifices aligned, e.g., radially and/or axially aligned, with the orifice of the housing; a piston disposed within the choke sleeve, the piston slidable relative to the choke sleeve to selectively cover and uncover one or more of the choking orifices of the choke sleeve, wherein when the piston is moved to uncover select choking orifices, fluid can flow from outside the housing, through the orifice of the housing, and through the select choking orifices; and a leakage flow inhibition mechanism configured to prevent or restrict fluid flow through a leakage gap formed annularly between the choke sleeve and the piston.

The leakage flow inhibition mechanism can include one or more flow restriction rings disposed on or in an inner surface of the choke sleeve and in contact with an outer surface of the piston to prevent or inhibit fluid flow through the leakage gap. The leakage flow inhibition mechanism can include one or more flow restriction rings disposed on or in an outer surface of the piston and in contact with an inner surface of the choke sleeve to prevent or inhibit fluid flow through the leakage gap. The leakage flow inhibition mechanism can include a retractable sleeve disposed radially or annularly between the choke sleeve and the piston and in contact with an inner surface of the choke sleeve to prevent or inhibit fluid flow through the leakage gap.

The leakage flow inhibition mechanism can include a flow restriction ring disposed on an outer surface of the piston and in contact with an inner surface of the choke sleeve to prevent or inhibit fluid flow through the leakage gap, the flow restriction ring comprising a first C-ring; a second C-ring; and an inner ring disposed between the first and second C-rings. The piston can include a main body and a retainer coupled to the main body. The flow restriction ring can be disposed on an outer surface of the retainer.

In some configurations, a choke for a flow control valve includes a housing having at least one orifice; a choke sleeve disposed within the housing, the choke sleeve having a plurality of choking orifices aligned, e.g., axially and/or radially aligned, with the orifice of the housing; a piston disposed within the choke sleeve, the piston slidable relative to the choke sleeve to selectively cover and uncover one or more of the choking orifices of the choke sleeve, wherein when the piston is moved to uncover select choking orifices, fluid can flow from outside the housing, through the orifice of the housing, and through the select choking orifices; and a flow restriction ring positioned at least partially annularly between the piston and the choke sleeve and configured to prevent or restrict fluid flow through a leakage gap formed annularly between the choke sleeve and the piston.

The choke can further include a choke seal disposed within the housing, wherein when the piston is moved to a closed position, the piston seals against the choke seal. The choke seal can be metal. The flow restriction ring can be metal. The piston can include a main body and a retainer coupled to an end of the main body. The flow restriction ring can be disposed about the retainer. The retainer can include a captive feature at an end of the retainer, the captive feature extending radially outwardly from and/or having a greater outer diameter than the main body of the piston, wherein the flow restriction ring is positioned axially between the captive feature and an end of the main body of the piston. The choke can include a gap radially between the flow restriction ring and an outer surface of the piston when the flow restriction ring is in a free state, wherein as the piston moves toward a closed position in use and the flow restriction ring moves adjacent or in contact with the choke seal, the flow restriction ring collapses into the gaps and reduces in diameter. The flow restriction ring can include a first C-ring; a second C-ring; and an inner ring disposed between the first and second C-rings, the inner ring comprising a first anti-rotation key extending into a gap in the first C-ring and a second anti-rotation key extending into a gap in the second C-ring.

In some configurations, a method of operating a flow control valve, the flow control valve comprising a housing having at least one orifice, a choke sleeve disposed within the housing, the choke sleeve having a plurality of choking orifices aligned with the orifice of the housing, and a piston disposed within the choke sleeve, the piston slidable relative to the choke sleeve, and an internal surface of the piston at least partially defining a flow passage through the flow control valve, includes sliding the piston relative to the choke sleeve to selectively uncover one or more select choking orifices of the plurality of choking orifices of the choke sleeve, thereby allowing fluid communication between an outside of the housing and the flow passage through the orifice of the housing and the select choking orifices; and inhibiting leakage flow through a leakage gap formed annularly between the choke sleeve and the piston.

Inhibiting leakage flow through the leakage gap can include slowing a flow rate of the leakage flow by passing the leakage flow through narrow flow passages formed between the piston and a flow restriction ring disposed about the piston and in contact with the choke sleeve. The method can further include collapsing the flow restriction ring to reduce a diameter of the flow restriction ring as the piston slides toward a closed position.

BRIEF DESCRIPTION OF THE FIGURES

Certain embodiments, features, aspects, and advantages of the disclosure will hereafter be described with reference to the accompanying drawings, wherein like reference numerals denote like elements. It should be understood that the accompanying figures illustrate the various implementations described herein and are not meant to limit the scope of various technologies described herein.

DETAILED DESCRIPTION

Figure 1:
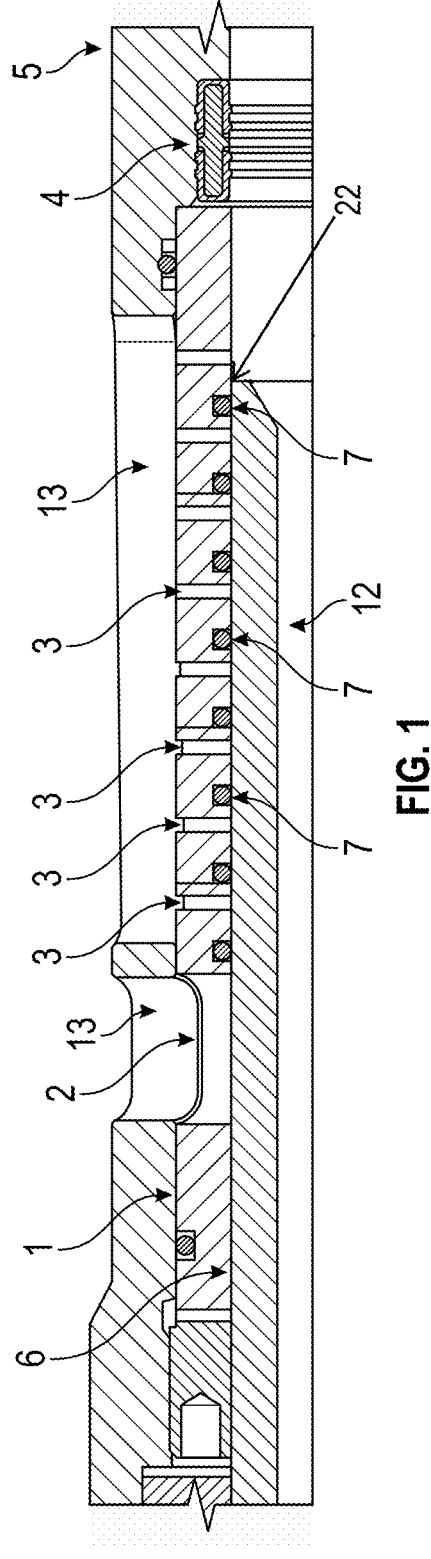
FIG. 1 shows a partial longitudinal cross-sectional view of an example embodiment of a flow control valve choke.

In the following description, numerous details are set forth to provide an understanding of some embodiments of the present disclosure. It is to be understood that the following disclosure provides many different embodiments, or examples, for implementing different features of various embodiments. Specific examples of components and arrangements are described below to simplify the disclosure. These are, of course, merely examples and are not intended to be limiting. However, it will be understood by those of ordinary skill in the art that the system and/or methodology may be practiced without these details and that numerous variations or modifications from the described embodiments are possible. This description is not to be taken in a limiting sense, but rather made merely for the purpose of describing general principles of the implementations. The scope of the described implementations should be ascertained with reference to the issued claims.

As used herein, the terms "connect", "connection", "connected", "in connection with", and "connecting" are used to mean "in direct connection with" or "in connection with via one or more elements"; and the term "set" is used to mean "one element" or "more than one element". Further, the terms "couple", "coupling", "coupled", "coupled together", and "coupled with" are used to mean "directly coupled together" or "coupled together via one or more elements". As used herein, the terms "up" and "down"; "upper" and "lower"; "top" and "bottom"; and other like terms indicating relative positions to a given point or element are utilized to more clearly describe some elements. Commonly, these terms relate to a reference point at the surface from which drilling operations are initiated as being the top point and the total depth being the lowest point, wherein the well (e.g., wellbore, borehole) is vertical, horizontal or slanted relative to the surface.

A valve, such as a flow control valve, can be actuated among a plurality of fluid flow positions. In some configurations, the present disclosure provides a choke system or valve adapted to choke fluid flow through one or more orifices of the valve. Typical flow trims in downhole flow control devices use a sleeve with orifices, slots, or the like coupled to an axially moveable sleeve which selectively covers or uncovers more or fewer of the orifices, slots, or the like to allow more or less flow across (e.g., into and/or out of) the body of the flow control device. Because the moveable sleeve must slide within or over the orifice sleeve, there is typically a gap 22, e.g., an annular or radial gap, between the two sleeves. Fluid flow may occur through this leakage gap 22, which can impact the performance of the flow control device. While leakage flow may be tolerated at low differential pressures, leakage flow can become a more significant problem at high differential pressures, particularly, for example, if sand particles are present in the fluid and the particles are small enough to fit within the gap 22. High velocity fluid flowing with sand particles can erode components of the valve, for example, the axially moveable sleeve.

The present disclosure generally relates to mechanisms to prevent, inhibit, reduce the likelihood or extent of, and/or protect against erosion of components of the flow control valve, for example, due to the effects of leakage flow, and flow control valves including such mechanisms.

As shown in FIG. 1, a flow control valve choke can include a housing 5, a choke sleeve 1, one or more choke seals 4, and a piston 6. The choke seals 4 help seal the valve internal volume from external volume when the piston is underneath the seals 4 in a full closed position or state of the choke. The choke seal(s) can be made of metal. The housing 5 can be a generally tubular body with a flow passage 12 extending axially therethrough. The housing 5 includes one or more openings 13 through (e.g., radially through) the body that place an exterior of the housing 5 in fluid communication with the flow passage 12. The choke sleeve 1 is disposed within the housing 5. In other words, the choke sleeve 1 is disposed radially within the housing 5. An outer or external surface of the choke sleeve 1 can be disposed adjacent and/or in contact with an inner or internal surface of the body of the housing 5.

The choke sleeve 1 includes one or more, e.g., a series of, large openings 2 and a series of choking orifices 3. The large openings 2 and choking orifices 3 underlie, or are aligned and in fluid communication with the openings 13 in the body of the housing 5. The one or more large openings 2 correspond to a fully open position or state of the choke and maximize flow area into or out of the valve when the valve is fully open. Each of the series of choking orifices 3 corresponds to an intermediate position or state of the choke and dictate flow characteristics of the choke relative to position of the piston 6.

The piston 6 is slidably disposed within the choke sleeve 1. In other words, the piston 6 is disposed radially within the choke sleeve 1. An outer or external surface of the piston 6 can be disposed adjacent and/or in contact with an inner or internal surface of the choke sleeve 1. An inner or internal surface of the piston 6 can define the flow passage 12. The piston 6 is slidable relative to the choke sleeve 1 to selectively cover and uncover choking orifices 3 of the choke sleeve 1. The piston 6 can be stopped at or moved to various positions relative the choke sleeve 1 to regulate the choke characteristics and manage flow rate vs. differential pressure. The piston 6 can be one piece or two or more pieces integrally formed or coupled together. The piston 6 can be monolithic or, for example, can include a coating on a portion or entirety of the piston 6.

In a full open position or state of the choke, the piston 6 is retracted or moved such that the large opening(s) 2 and all of the choking orifices 3 are uncovered and in fluid communication with the flow passage 12. The flow passage 12 is therefore in fluid communication with the exterior of the choke via the large opening(s) 2, choking orifices 3, and openings 13 in the body of the housing 5. At the full open position, the piston 6 allows a maximum flow path for letting fluid travel across the choke while minimizing pressure losses. In a full closed position or state of the choke, the piston 6 is extended or moved such that the large opening(s) 2 and all choking orifices 3 are covered by the piston not in fluid communication with the flow passage 12. The flow passage 12 is therefore not in fluid communication with the exterior of the choke. At the full closed position, the piston 6 lodges underneath the seal stack 4 to seal off the internal volume of the valve (tubing volume) from the external volume (annulus). The piston 6 can also be moved to a plurality of intermediate positions between the full open and full closed positions in which some of the choking orifices 3 are covered. For example, as the piston 6 moves from the full closed position toward the full open position, more of the choking orifices 3 are progressively uncovered such that fluid flow between the exterior of the choke and the flow passage 12 gradually increases. In some configurations, the extremity or end of the piston 6 can include a hard coating and/or be made of highly erosion resistant material to withstand the flow of fluid charged with particulates while minimizing erosion damage.

In use, undesirable leakage flow can occur between (e.g., radially or annularly between) the choke sleeve 1 and the piston 6. The present disclosure describes various mechanisms to prevent or minimize leakage flow, for example, by blocking the leakage gap 22 between the choke sleeve 1 and the piston 6 or creating a difficult and narrow flow path for leakage flow, which can help reduce the speed of the leakage flow and prevent or inhibit erosion.

In some configurations, for example as shown in FIG. 1, one or more flow restriction rings 7 can be mounted to, in, or on the choke sleeve 1. In the illustrated configuration, the flow restriction rings 7 are retained by, on, or in an inner circumference or surface of the choke sleeve 1. For example, the flow restriction rings 7 can be disposed in recesses or grooves in the inner surface of the choke sleeve 1. The flow restriction rings 7 contact the piston 6, e.g., an outer circumference, perimeter, or surface of the piston 6, to stop, reduce, or restrict fluid flow through the leakage gap 22 between the choke sleeve 1 and the piston 6 and/or to cause particles moving through the leakage gap 22 to bridge off and plug fluid flow.

Figure 2:
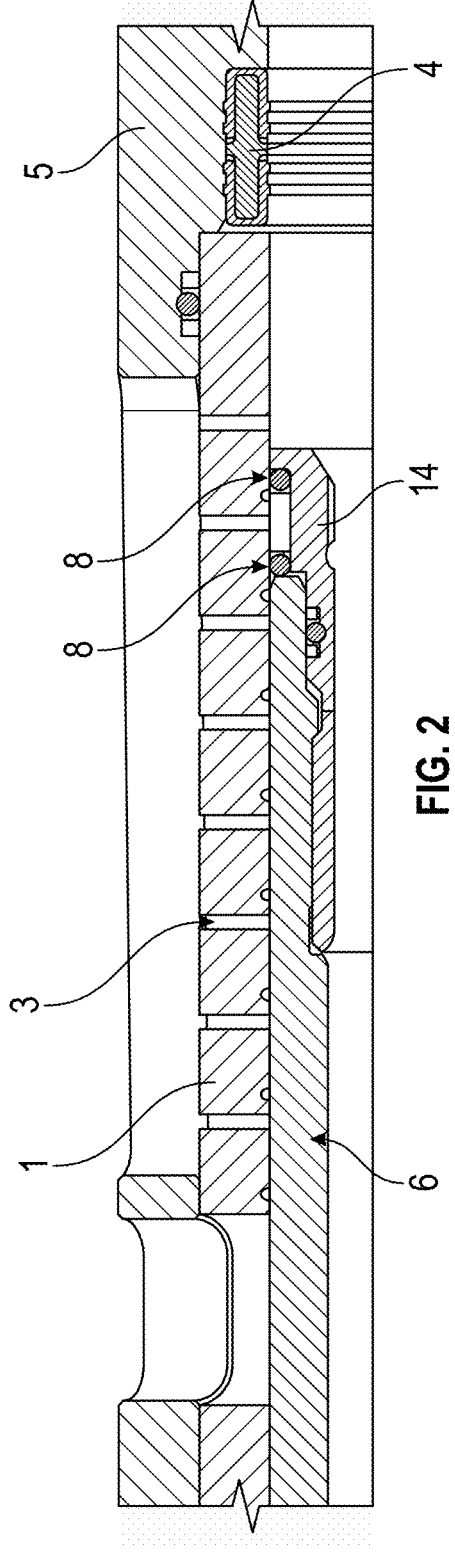
FIG. 2 shows a partial longitudinal cross-sectional view of an example embodiment of a flow control valve choke.

In some configurations, for example as shown in FIG. 2, one or more flow restriction rings 8 can be mounted to, in, or on the piston 6. For example, the flow restriction rings 8 can be disposed in recesses or grooves in an outer surface of the piston 6. The flow restriction rings 8 contact the choke sleeve 1, e.g., an inner circumference, perimeter, or surface of the choke sleeve 1, to stop, reduce, or restrict fluid flow through the leakage gap 22 between the choke sleeve 1 and the piston 6 and/or to cause particles moving through the leakage gap 22 to bridge off and plug fluid flow. In the illustrated configuration, the restriction rings 8 are mounted in recesses or grooves in an outer surface of an end cap portion 14 of the piston 6. The end cap portion 14 can be made of or coated with a hard coating or erosion resistant material. The end cap portion 14 can be integrally formed with or coupled to a main body of the piston 6. In the illustrated configuration, a portion of the end cap portion 14 is disposed within or underlies a portion of the main body of the piston 6. In other words, an outer surface of a portion of the end cap portion 14 is disposed adjacent and/or contacts the inner surface of a portion of the main body of the piston 6, and the flow path 12 is defined by inner surfaces of the end cap portion 14 and a portion of the main body of the piston 6.

Figure 3:
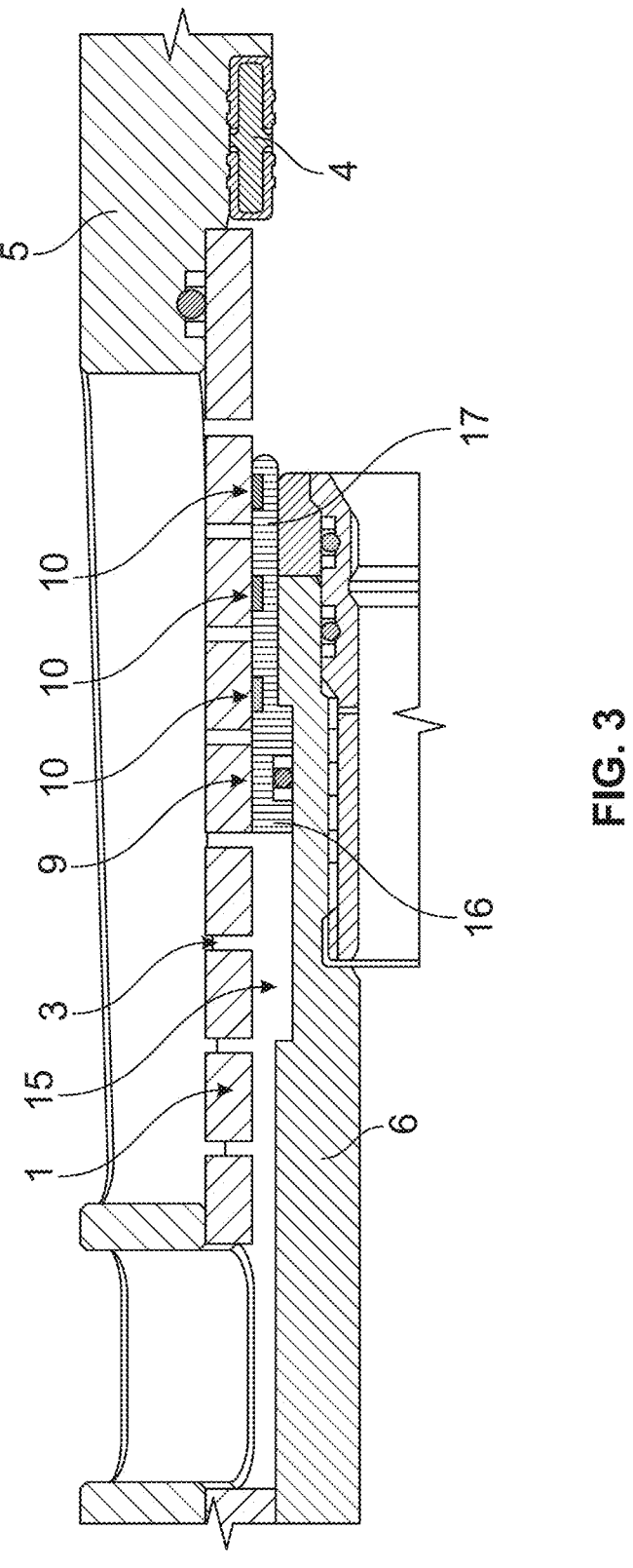
FIG. 3 shows a partial longitudinal cross-sectional view of an example embodiment of a flow control valve choke.

In some configurations, for example as shown in FIG. 3, the choke includes a flow restriction retractable sleeve 9 disposed radially or annularly between the choke sleeve 1 and the piston 6. The sleeve 9 can be retained by or within the piston 6. The sleeve 9, e.g., an outer surface of the sleeve 9, contacts the choke sleeve 1, e.g., an inner surface of the choke sleeve 1, to stop, reduce, or restrict fluid flow through the leakage gap 22 between the choke sleeve 1 and the piston 6 and/or to cause particles moving through the leakage gap 22 to bridge off and plug fluid flow. In some configurations, the sleeve 9 extends beyond the tip or end of the piston 6.

The sleeve 9 can be partially moveable or retractable relative to the piston 6. The sleeve 9 can include a body 16 and a nose 17 extending from the body 16. The body 16 is thicker or has a greater radial dimension than the nose 17. The outer surface of the piston 6 can include a recess 15. The body 16 of the sleeve 9 is partially disposed in the recess 15 and can move or slide within the recess 15. In the illustrated configuration, the choke seals 4 are radially inwardly offset from the choke sleeve 1 such that the choke seals 4 extend inwardly to a greater extent than the choke sleeve 1. When the piston 6 moves to the full closed position, the end of the nose 17 abuts (e.g., axially abuts) the choke seals 4 such that the sleeve 9 stops sliding, while the piston 6 continues extending or sliding until the piston 6 at least partially underlies the choke seals 4 and the body 16 of the sleeve 9 abuts the opposite end of the recess 15 (the left end in the orientation of FIG. 3).

In some configurations, one or more flow restriction rings 10 are mounted to, in, or on an outer surface of the sleeve 9. The flow restriction rings 10 can contact the inner surface of the choke sleeve 1 instead of or in addition to the outer surface of the sleeve 9 to stop, reduce, or restrict fluid flow through the leakage gap 22 between the choke sleeve 1 and the piston 6 and/or to cause particles moving through the leakage gap 22 to bridge off and plug fluid flow. In the illustrated configuration, flow restriction rings are disposed in recesses or grooves in the outer surface of the sleeve 9. In other configurations, the flow restriction rings are mounted to, in, or on an inner surface of the choke sleeve 1 and contact the outer surface of the sleeve 9.

Figure 4:
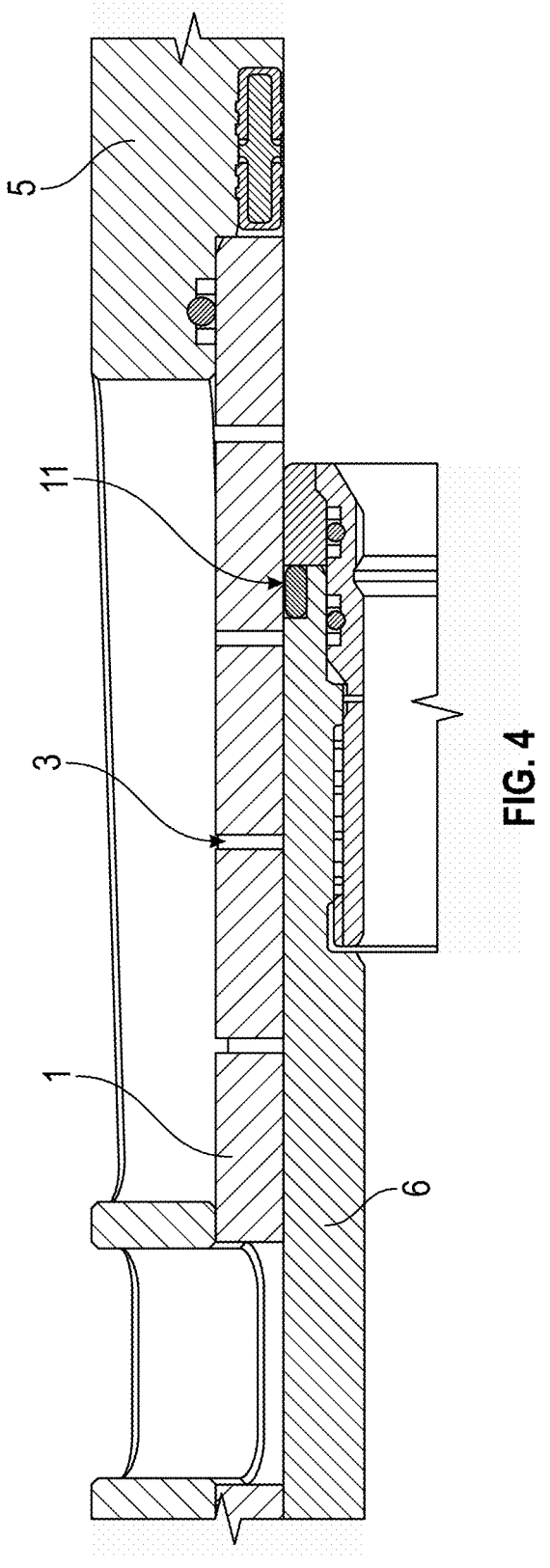
FIG. 4 shows a partial longitudinal cross-sectional view of an example embodiment of a flow control valve choke.
Figure 5:
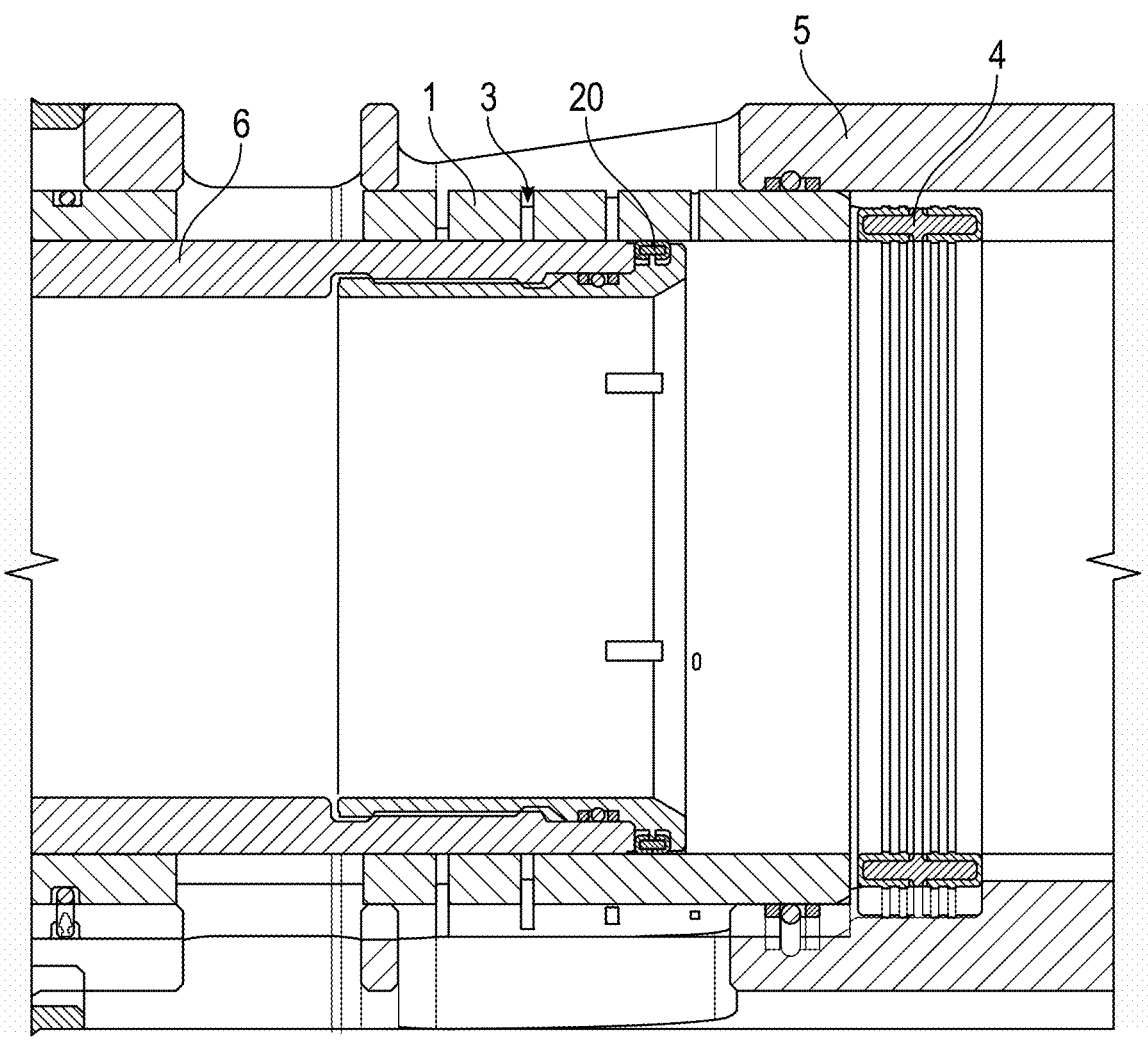
FIG. 5 shows a partial longitudinal cross-sectional view of an example embodiment of a flow control valve choke.
Figure 6:
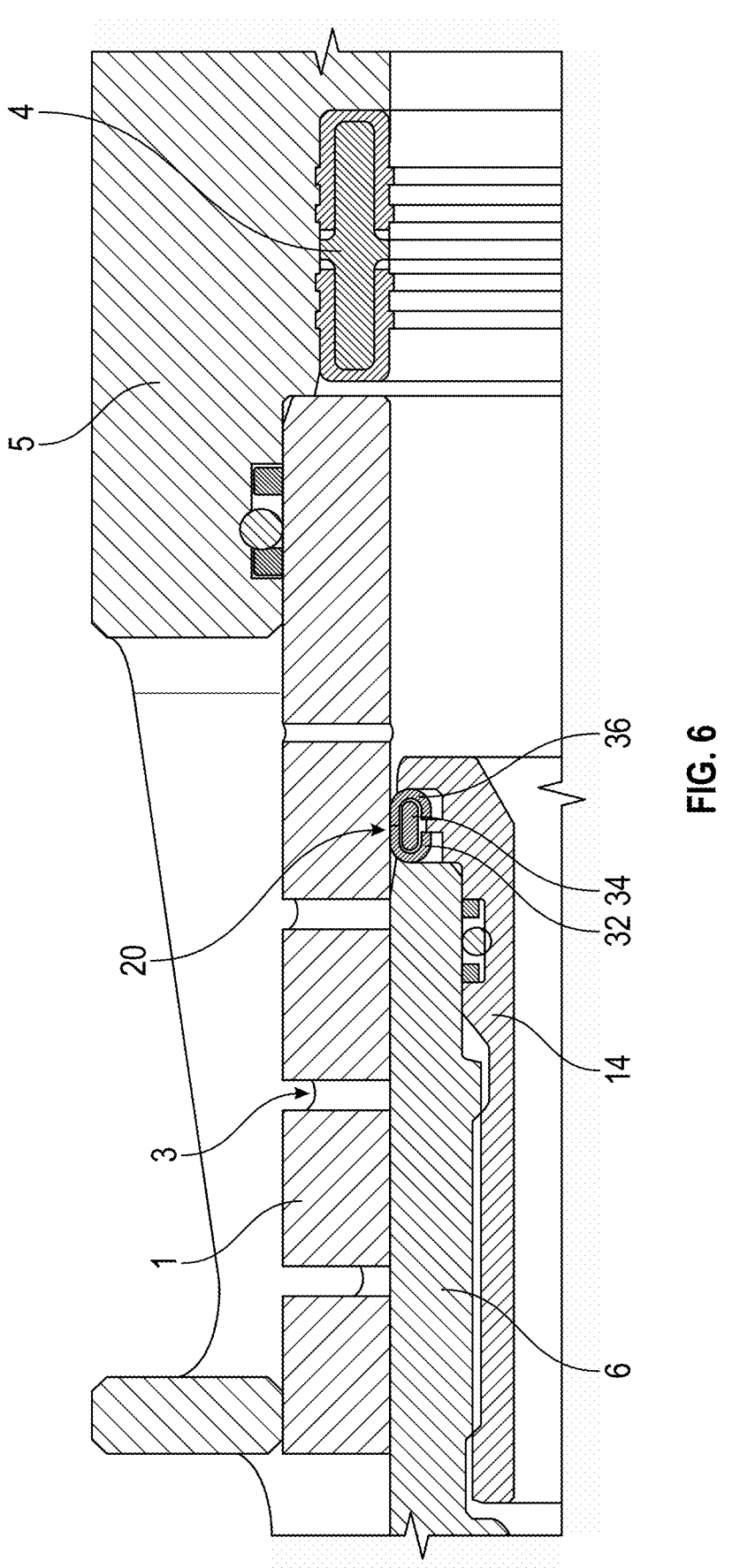
FIG. 6 shows a close-up view of a portion of FIG. 5.
Figure 7A:
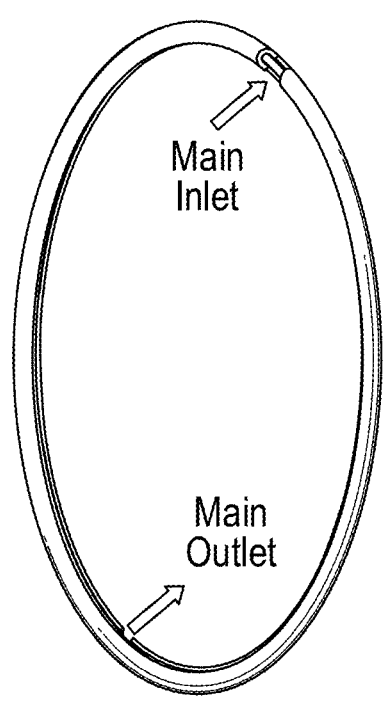
FIG. 7A shows a perspective view of an example flow restriction ring of the flow control valve choke of FIG. 5.
Figure 7B:
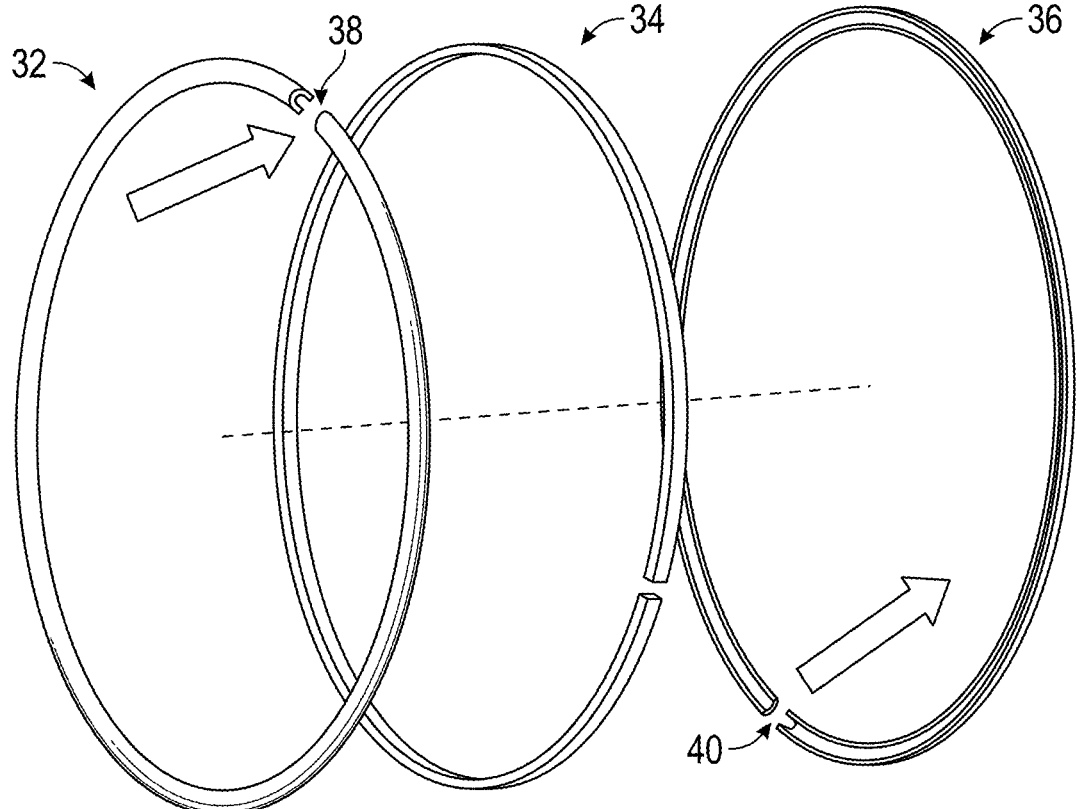
FIG. 7B shows an exploded view of the flow restriction ring of FIG. 7A.
Figure 8:
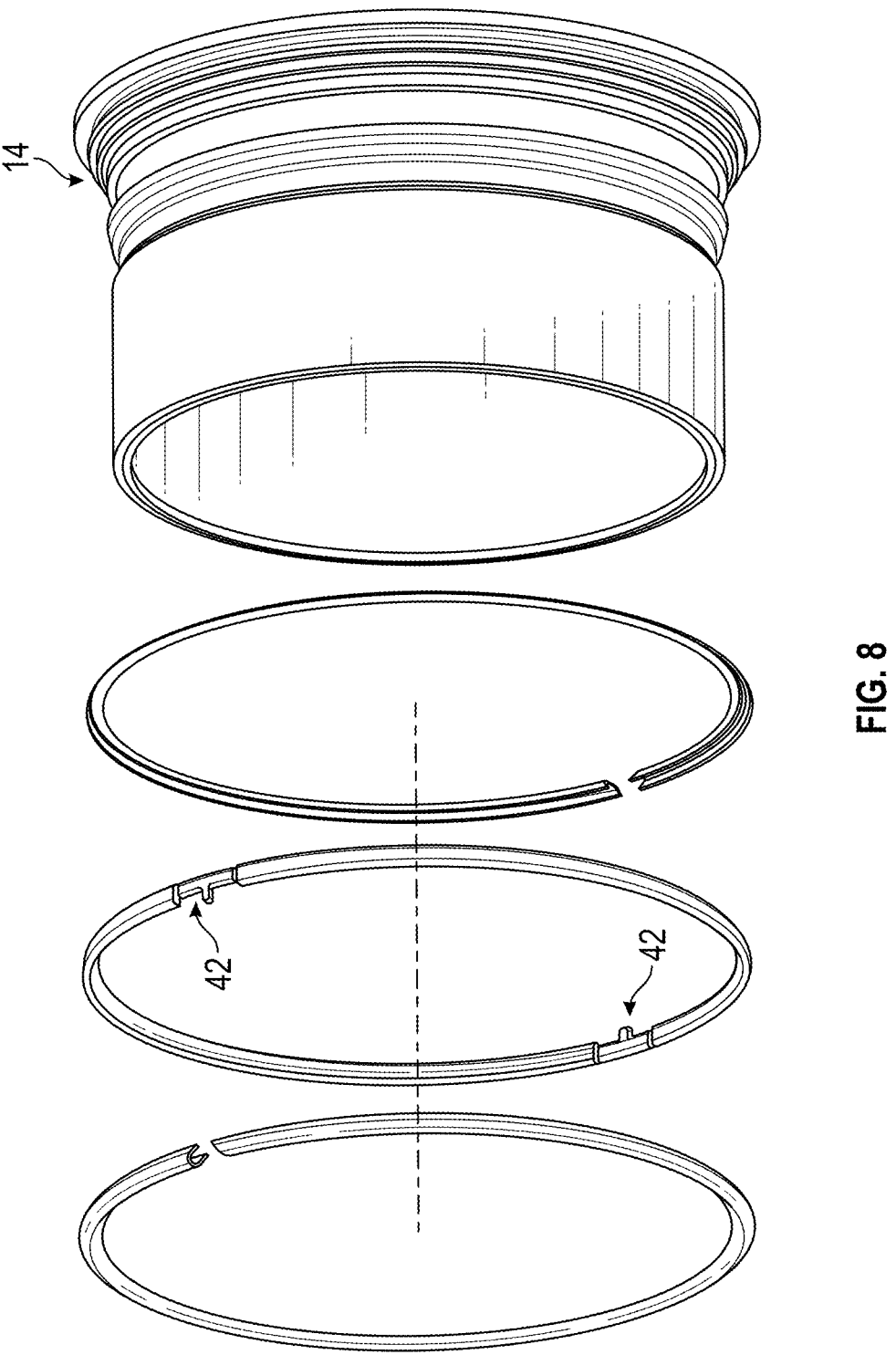
FIG. 8 shows an exploded view of the flow restriction ring and retainer of FIG. 5.

In some configurations, for example as shown in FIG. 4, one or more flow restriction rings 11 can be mounted to, in, or on the piston 6. For example, the flow restriction rings 11 can be disposed in recesses or grooves in an outer surface of the piston 6. The flow restriction rings 11 contact the choke sleeve 1, e.g., an inner circumference, perimeter, or surface of the choke sleeve 1, to stop, reduce, or restrict fluid flow through the leakage gap 22 between the choke sleeve 1 and the piston 6 and/or to cause particles moving through the leakage gap 22 to bridge off and plug fluid flow. The rings 11 can be made of a single component (e.g., monolithic) or multiple components. The rings 11 can pass through or adjacent the choke seals 4 such that the sealing surface for the choke seals 4 on the piston 6 can be on either side of the flow restriction rings 11. The ring(s) 11 can be located between two choking orifices of the choke sleeve 1 in use.

Figure 10:
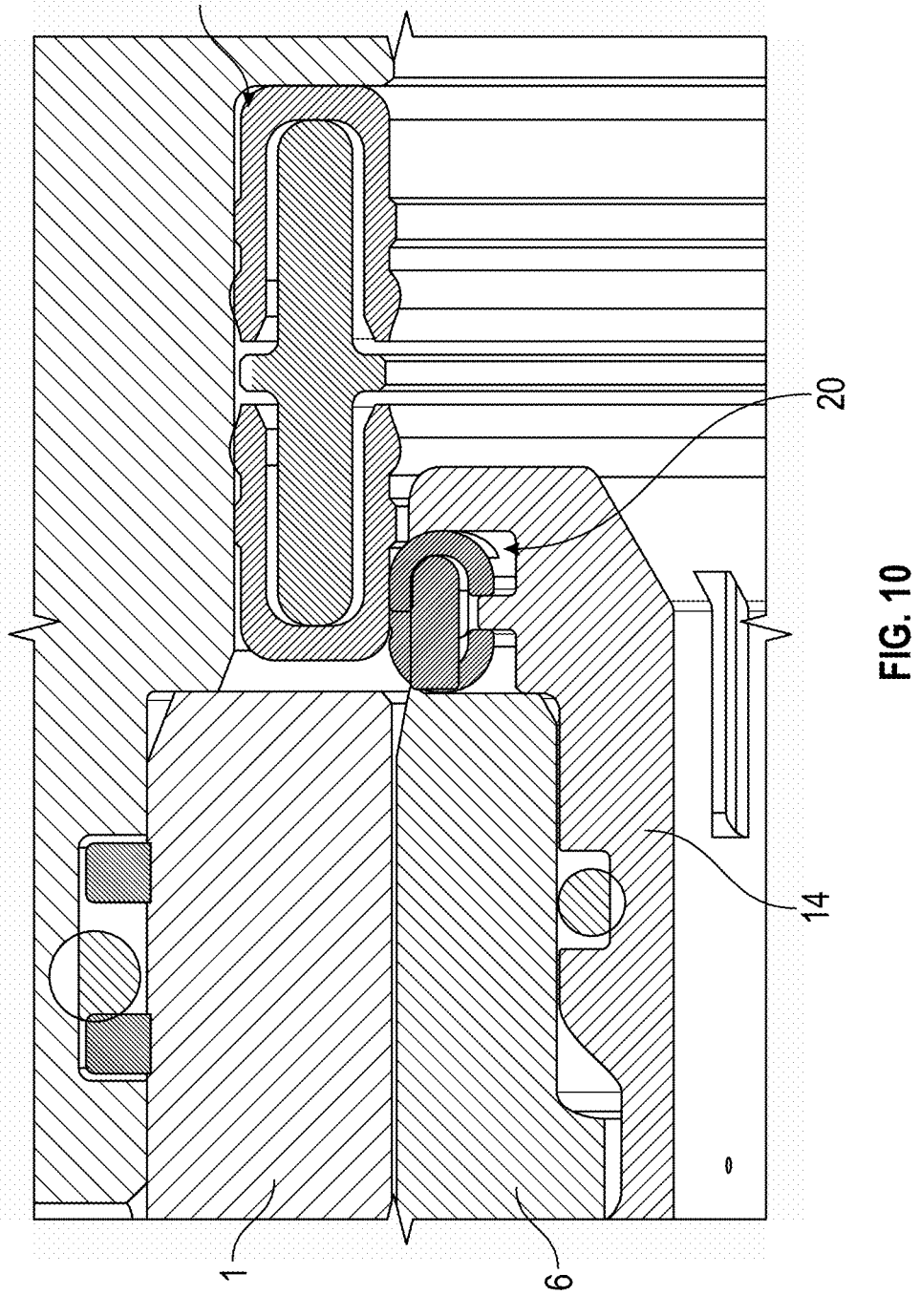
FIG. 10 shows the choke of FIG. 5 with the flow restriction ring sliding through the choke seal.
Figure 11:
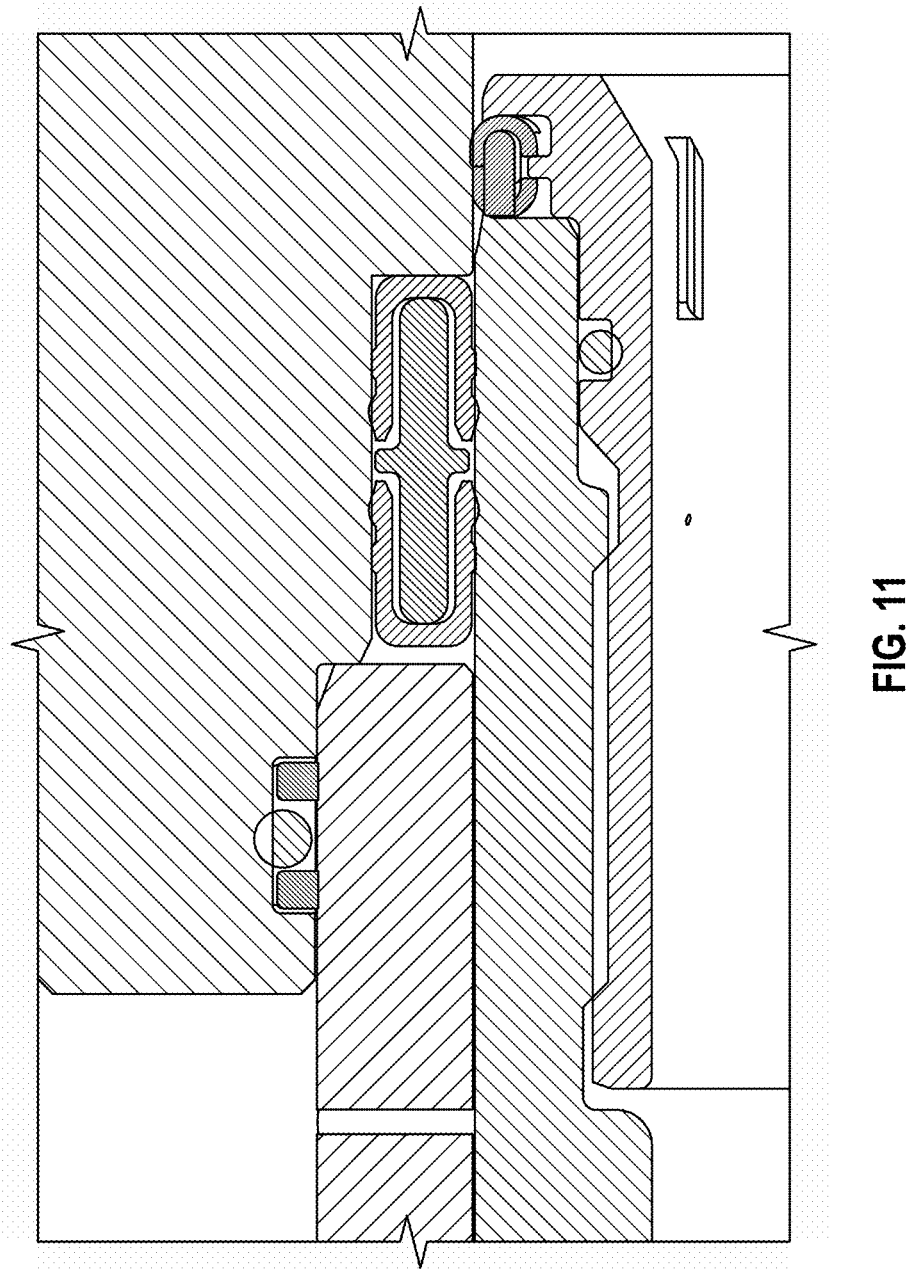
FIG. 11 shows the choke of FIG. 5 in a closed position.

FIGS. 5-8 show an example configuration of a flow restriction ring 20. In some configurations, the flow restriction ring 20 is made of metal. The flow restriction ring 20 can be mounted to, in, or on the piston 6. For example, the flow restriction ring 20 can be disposed in a recess or groove in an outer surface of the piston 6. In the illustrated configuration, the piston 6 includes an end cap portion 14 that functions as a retainer for the restriction ring 20, and the restriction ring 20 is disposed about an outer surface of the retainer 14. A portion of the retainer 14 is disposed within or underlies a portion of the main body of the piston 6. In other words, an outer surface of a portion of the retainer 14 is disposed adjacent and/or contacts the inner surface of a portion of the main body of the piston 6, and the flow path 12 is defined by inner surfaces of the retainer 14 and a portion of the main body of the piston 6. The flow restriction ring 20 contacts the choke sleeve 1, e.g., an inner circumference, perimeter, or surface of the choke sleeve 1, to stop, reduce, or restrict fluid flow through the leakage gap 22 between the choke sleeve 1 and the piston 6 and/or to cause particles moving through the leakage gap 22 to bridge off and plug fluid flow. As the choke moves toward a closed position, the restriction ring 20 can slide under the choke seal(s) 4, as shown in FIGS. 10-11.

In the illustrated configuration, the ring 20 includes or is made up of multiple components. As shown in the exploded view of FIG. 7B, the flow restriction ring 20 includes a first C-ring 32, a second C-ring 36, and an inner ring 34. Two anti-rotation keys 42 are coupled to or included as part of the inner ring 34. When assembled, the inner ring 34 is disposed or sandwiched between the first C-ring 32 and the second C-ring 36. In other words, the first 32 and second 36 C-rings are oriented such that their openings face or oppose each other, and the inner ring 34 is disposed at least partially within the C-ring openings.

Figure 9:
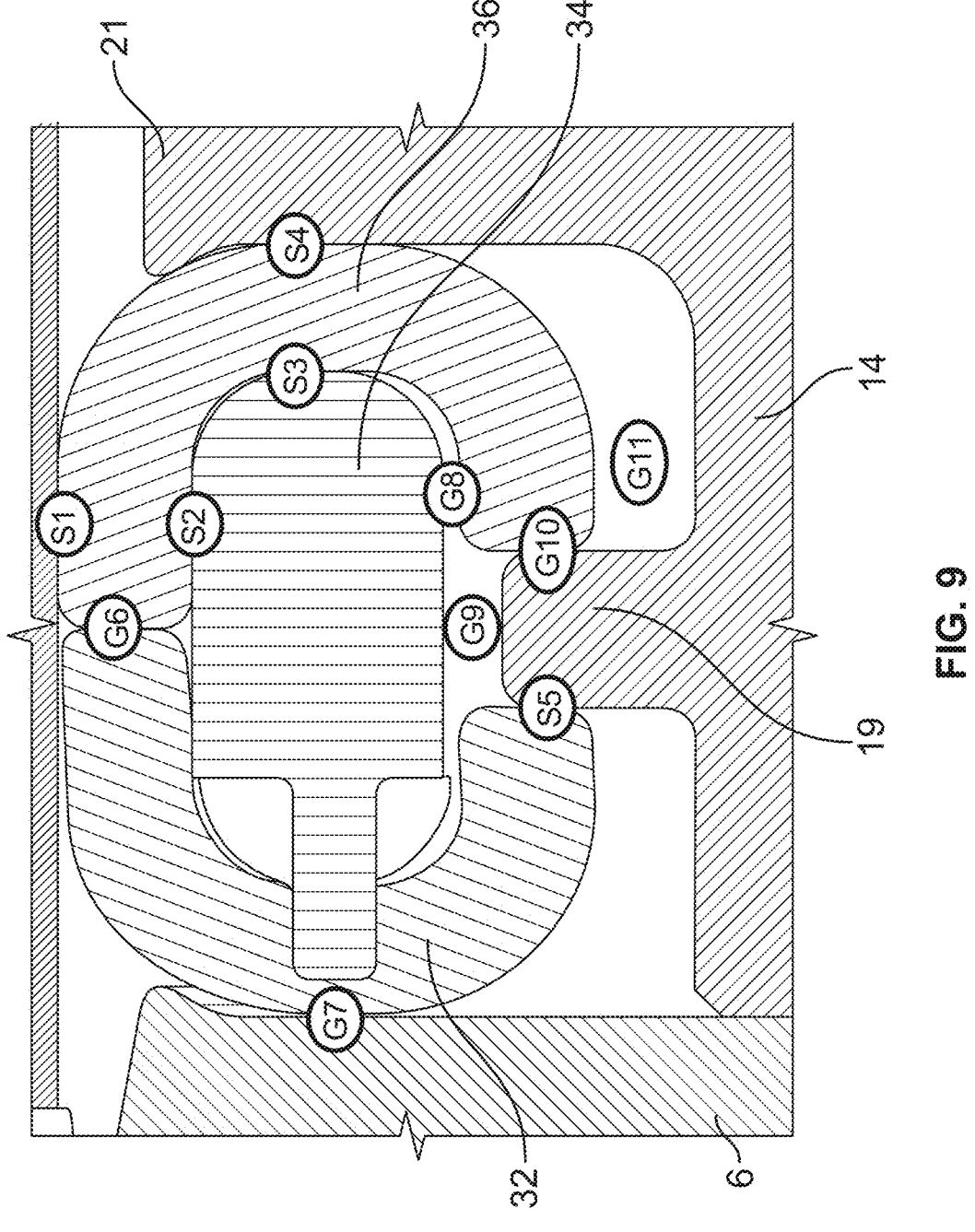
FIG. 9 shows a close-up of a portion of the flow control valve choke of FIG. 5.

As shown in, for example, FIG. 9, the retainer 14 can include a captive feature 21 at or near an end of the retainer 14. The captive feature 21 projects outwardly from or has a greater diameter than a remainder of the retainer 14. The ring 20 can be disposed between (e.g., axially between) the captive feature 21 of the retainer 14 and the end of the main body of the piston 6. In the illustrated configuration, the retainer 14 includes a projection 19 between (e.g., axially between) the captive feature 21 and the end of the main body of the piston 6. When assembled, lower edges (or at least portions thereof) of the C-rings 32, 36 abut opposing sides of the projection 19 such that the projection 19 is sandwiched between the lower edges of the C-rings 32, 36.

The first C-ring 32 has a gap or opening 38, and the second C-ring 36 has a gap or opening 40. The gaps 38, 40 allow the C-rings to collapse in use, for example as the ring 20 passes through the choke seal 4 when moving to a closed position so that the ring 20 does not damage the choke seal 4. The gap 38 of the first C-ring 32 also functions as a main inlet for leakage flow through the ring 20, and the gap 40 of the second C-ring 36 also functions as a main outlet for leakage flow through the ring 20. The inner ring 34 includes two anti-rotation keys 42. In the illustrated configuration, the anti-rotation keys are positioned about the inner ring 34 180° from each other and oriented to face in opposing directions. When assembled, one of the anti-rotation keys 42 is positioned or disposed in the gap 38 of the first C-ring 32, and the other anti-rotation key 42 is positioned or disposed in the gap 40 of the second C-ring 36.

When assembled and disposed in the choke, the ring 20 creates narrow channels to guide leakage flow through the ring 20. FIG. 9 shows various sealing areas (S1-S5) and gaps (G6-G11) formed among the ring 20, piston 6, and retainer 14 when the components are assembled. The gaps G6-G11 form part of the narrow channels for the leakage flow. The narrow channels remove kinetic energy from the fluid due to wall friction and changes in flow direction, thereby resulting in a reduction of the flow speed of the leakage flow. The ring 20 is bidirectional. In other words, the flow restriction ring 20 functions for flow running from left to right or from right to left in the orientation of the figures. Positioning the anti-rotation keys 42 180° apart advantageously helps create the narrow path with changing directions for leakage flow, whereas if the anti-rotation keys 42 were in alignment, the leakage flow could have a straight path through the ring 20, thereby allowing higher flow velocities and erosion.

The inner ring 34 helps fill the C-rings 32, 36 and create the narrow channels for leakage flow. The inner ring 34 also causes both C-rings 32, 36 to collapse at the same time. For example, if the valve is closing (piston 6 moving from left to right in the orientation of the figures), the second C-ring 36 collapses, reducing its diameter. The second C-ring 36 collapsing forces the inner ring 34 to collapse as well, which in turn forces the first C-ring 32 to collapse. In its free or uncollapsed state, the flow restriction ring 20 has an outer diameter slightly larger than an inner diameter of the choke seal 4. If the ring 20 did not collapse as it passed under the choke seal 4, the choke seal 4 and/or ring 20 could be damaged. Gaps, for example, gaps G11 and/or G9, shown in FIG. 9, allow the ring 20 to compress and/or move downward as the ring 20 passes under the choke seal 4.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately," "about," "generally," and "substantially" may refer to an amount that is within less than 10% of, within less than 5% of, within less than 1% of, within less than 0.1% of, and/or within less than 0.01% of the stated amount. As another example, in certain embodiments, the terms "generally parallel" and "substantially parallel" or "generally perpendicular" and "substantially perpendicular" refer to a value, amount, or characteristic that departs from exactly parallel or perpendicular, respectively, by less than or equal to 15 degrees, 10 degrees, 5 degrees, 3 degrees, 1 degree, or 0.1 degree.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims. It is also contemplated that various combinations or sub-combinations of the specific features and aspects of the embodiments described may be made and still fall within the scope of the disclosure. It should be understood that various features and aspects of the disclosed embodiments can be combined with, or substituted for, one another in order to form varying modes of the embodiments of the disclosure. Thus, it is intended that the scope of the disclosure herein should not be limited by the particular embodiments described above.

What is claimed is:

1. A flow control valve comprising:
a housing having a first orifice and a second orifice each extending through the housing, the first orifice being axially spaced from the second orifice;
a choke sleeve disposed within the housing, the choke sleeve having:
an opening extending through the choke sleeve and aligned with the first orifice of the housing; and
a plurality of choking orifices extending through the choke sleeve and spaced axially from the opening, wherein each choking orifice of the plurality of choking orifices is radially aligned with the second orifice of the housing;
a piston disposed within the choke sleeve, the piston slidable relative to the choke sleeve to selectively cover and uncover one or more choking orifices of the plurality of choking orifices of the choke sleeve and the opening of the choke sleeve, wherein:
in response to the piston being moved to uncover select choking orifices, fluid is permitted to flow from outside the housing, through the second orifice of the housing, and through the select choking orifices;
in response to the piston being moved to further uncover the opening of the choke sleeve, fluid is permitted to flow from outside the housing, through the first orifice, and through the opening of the choke sleeve; and
in a given position of the piston, fluid communication is established via the one or more choking orifices; and
a leakage flow inhibition mechanism configured to prevent or restrict fluid flow through a leakage gap formed annularly between the choke sleeve and the piston, wherein the leakage flow inhibition mechanism includes a retractable sleeve disposed radially or annularly between the choke sleeve and the piston and in contact with an inner surface of the choke sleeve to prevent or inhibit fluid flow through the leakage gap, wherein the retractable sleeve includes a body and a nose extending axially from the body, the nose having a smaller thickness than a thickness of the body, wherein the body is disposed within a recess in an outer surface of the piston, and wherein the nose is disposed between the outer surface of the piston and the choke sleeve.

2. The flow control valve of claim 1, wherein the leakage flow inhibition mechanism comprises one or more flow restriction rings disposed on or in the inner surface of the choke sleeve and in contact with an outer surface of the retractable sleeve to prevent or inhibit fluid flow through the leakage gap.

3. The flow control valve of claim 1, wherein the leakage flow inhibition mechanism comprises one or more flow restriction rings disposed on or in an outer surface of the retractable sleeve and in contact with the inner surface of the choke sleeve to prevent or inhibit fluid flow through the leakage gap.

4. The flow control valve of claim 1, wherein the piston comprises a main body and a retainer coupled to the main body.

5. The flow control valve of claim 1, wherein the leakage flow inhibition mechanism comprises a flow restriction ring disposed on an outer surface of the retractable sleeve and in contact with the inner surface of the choke sleeve to prevent or inhibit fluid flow through the leakage gap, the flow restriction ring comprising:
a first C-ring;
a second C-ring; and
an inner ring disposed between the first and second C-rings.

6. A choke for a flow control valve, the choke comprising:
a housing having a first orifice and a second orifice each extending through the housing, the first orifice being axially spaced from the second orifice;
a choke sleeve disposed within the housing, the choke sleeve having:
an opening extending through the choke sleeve and aligned with the first orifice of the housing; and
a plurality of choking orifices extending through the choke sleeve and spaced axially from the opening, wherein each choking orifice of the plurality of choking orifices is radially aligned with the second orifice of the housing;
a piston disposed within the choke sleeve, the piston including a main body and a retainer coupled to an end of the main body, and the piston slidable relative to the choke sleeve to selectively cover and uncover one or more of the plurality of choking orifices of the choke sleeve and the opening of the choke sleeve, wherein:
in response to the piston being moved to uncover select choking orifices, fluid is permitted to flow from outside the housing, through the second orifice of the housing, and through the select choking orifices;
in response to the piston being moved to further uncover the opening of the choke sleeve, fluid is permitted to flow from outside the housing through the first orifice and the opening of the choke sleeve; and
in a given position of the piston, fluid communication is established via the one or more of the plurality of choking orifices;
a flow restriction ring positioned at least partially annularly between the piston and the choke sleeve and configured to prevent or restrict fluid flow through a leakage gap formed annularly between the choke sleeve and the piston, wherein the flow restriction ring is disposed about the retainer; and
a gap radially between the flow restriction ring and an outer surface of the piston when the flow restriction ring is in a free state, wherein as the piston moves toward a closed position in use and the flow restriction ring moves adjacent to or in contact with a choke seal, the flow restriction ring collapses into the gap and reduces in diameter.

7. The choke of claim 6, further comprising the choke seal disposed within the housing, wherein in response to the piston being moved to the closed position, the piston seals against the choke seal.

8. The choke of claim 7, wherein the choke seal is metal.

9. The choke of claim 6, wherein the flow restriction ring is metal.

10. The choke of claim 6, wherein the retainer comprises a captive feature at an end of the retainer, the captive feature extending radially outwardly from and/or having a greater outer diameter than the main body of the piston, and wherein the flow restriction ring is positioned axially between the captive feature and an end of the main body of the piston.

11. The choke of claim 6, the flow restriction ring comprising:

a first C-ring;

a second C-ring; and an inner ring disposed between the first and second C-rings, the inner ring comprising a first anti-rotation key extending into a gap in the first C-ring and a second anti-rotation key extending into a gap in the second C-ring.

12. A method of operating a flow control valve, the flow control valve comprising a housing having a first orifice and a second orifice each extending through the housing, the first orifice being axially spaced from the second orifice, a choke sleeve disposed within the housing, the choke sleeve having an opening extending through the choke sleeve and aligned with the first orifice of the housing and a plurality of choking orifices extending through the choke sleeve and spaced axially from the opening, wherein each choking orifice of the plurality of choking orifices is radially aligned with the second orifice of the housing, and a piston disposed within the choke sleeve, the piston slidable relative to the choke sleeve, and an internal surface of the piston at least partially defining a flow passage through the flow control valve, the method comprising:

sliding the piston relative to the choke sleeve to selectively uncover one or more select choking orifices of the plurality of choking orifices of the choke sleeve, thereby permitting fluid communication between an outside of the housing and the flow passage through the second orifice of the housing and the select choking orifices;

inhibiting leakage flow through a leakage gap formed annularly between the choke sleeve and the piston, wherein inhibiting leakage flow through the leakage gap includes slowing a flow rate of the leakage flow by passing the leakage flow through narrow flow passages formed between the piston and a flow restriction ring disposed about the piston and in contact with the choke sleeve;

and collapsing the flow restriction ring to reduce a diameter of the flow restriction ring as the piston slides toward a closed position.

\* \* \* \* \*